US010812580B2

(12) United States Patent
Holland et al.

(10) Patent No.: US 10,812,580 B2
(45) Date of Patent: Oct. 20, 2020

(54) USING RESOURCE TIMING DATA FOR SERVER PUSH

(71) Applicant: Akamai Technologies, Inc., Cambridge, MA (US)

(72) Inventors: Mark C. Holland, Beverly, MA (US); Manish Jain, Somerville, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 15/011,412

(22) Filed: Jan. 29, 2016

(65) Prior Publication Data

US 2016/0226998 A1    Aug. 4, 2016

Related U.S. Application Data

(60) Provisional application No. 62/110,413, filed on Jan. 30, 2015, provisional application No. 62/110,416, filed on Jan. 30, 2015, provisional application No. 62/110,418, filed on Jan. 30, 2015.

(51) Int. Cl.
*H04L 29/08* (2006.01)
*H04L 12/26* (2006.01)
*H04L 29/06* (2006.01)

(52) U.S. Cl.
CPC ...... *H04L 67/1076* (2013.01); *H04L 43/0852* (2013.01); *H04L 67/40* (2013.01)

(58) Field of Classification Search
CPC .............................................. G06F 17/30902
See application file for complete search history.

(56) References Cited

U.S. PATENT DOCUMENTS

| | | | |
|---|---|---|---|
| 5,737,619 | A | 4/1998 | Judson |
| 5,802,292 | A | 9/1998 | Mogul |
| 5,924,116 | A | 7/1999 | Aggarwal et al. |
| 6,023,726 | A | 2/2000 | Saksena |
| 6,055,572 | A | 4/2000 | Saksena et al. |
| 6,085,193 | A | 7/2000 | Malkin et al. |
| 6,085,226 | A | 7/2000 | Horvitz et al. |
| 6,088,718 | A | 7/2000 | Altschuler et al. |
| 6,167,438 | A | 12/2000 | Yates et al. |
| 6,393,526 | B1 | 5/2002 | Crow et al. |
| 6,799,214 | B1 | 9/2004 | Li et al. |
| 6,820,133 | B1 | 11/2004 | Grove et al. |

(Continued)

FOREIGN PATENT DOCUMENTS

EP    1398715    3/2004

OTHER PUBLICATIONS

Uzonov (SPeeding Up Tor With SPDY, Munich Technical University) (Year: 2013).*

(Continued)

*Primary Examiner* — Nicholas P Celani

(57) ABSTRACT

This patent document describes, among other things, methods and systems for determining which if any page resources a server might push to a client (using, e.g., an HTTP 2.0 server push mechanism). The approaches described herein improve web page load times by pushing page resources that a client is likely to need to render the base page, while reducing wasteful server pushes of resources that the client is unlikely to request from the server because, for example, they are already cached at the client.

11 Claims, 5 Drawing Sheets

(56) References Cited

U.S. PATENT DOCUMENTS

| | | | |
|---|---|---|---|
| 6,931,439 | B1 | 8/2005 | Hanmann et al. |
| 7,111,057 | B1 | 9/2006 | Wein et al. |
| 7,240,100 | B1 | 7/2007 | Wein et al. |
| 7,274,658 | B2 | 9/2007 | Bornstein et al. |
| 7,296,082 | B2 | 11/2007 | Leighton et al. |
| 7,343,396 | B2 | 3/2008 | Kausik et al. |
| 7,376,716 | B2 | 5/2008 | Dilley et al. |
| 7,472,178 | B2 | 12/2008 | Rose et al. |
| 7,596,619 | B2 | 9/2009 | Leighton et al. |
| 7,600,025 | B2 | 10/2009 | Lewin et al. |
| 7,607,062 | B2 | 10/2009 | Grove et al. |
| 7,660,296 | B2 | 2/2010 | Fletcher et al. |
| 8,112,471 | B2 | 2/2012 | Wei et al. |
| 8,447,837 | B2 | 5/2013 | Devanneaux et al. |
| 8,583,820 | B2 | 11/2013 | Harrang et al. |
| 8,589,508 | B2 | 11/2013 | Harrang et al. |
| 8,589,585 | B2 | 11/2013 | Harrang et al. |
| 8,824,289 | B2 | 9/2014 | Gormley et al. |
| 8,832,305 | B2 | 9/2014 | Moinzadeh et al. |
| 8,856,263 | B2 | 10/2014 | Fainberg et al. |
| 8,886,790 | B2 | 11/2014 | Harrang et al. |
| 9,106,607 | B1 * | 8/2015 | Lepeska .............. G06F 16/9574 |
| 9,118,623 | B1 | 8/2015 | Devanneaux et al. |
| 9,363,329 | B1 | 6/2016 | Kolam et al. |
| 9,613,158 | B1 | 4/2017 | Lepeska |
| 9,641,549 | B2 | 5/2017 | Holloway et al. |
| 10,009,439 | B1 | 6/2018 | Kolam |
| 10,291,738 | B1 | 5/2019 | Jaiswal et al. |
| 2002/0103778 | A1 | 8/2002 | Saxena et al. |
| 2003/0065743 | A1 | 4/2003 | Jenny et al. |
| 2003/0101234 | A1 | 5/2003 | McBrearty et al. |
| 2003/0182357 | A1 | 9/2003 | Chess et al. |
| 2004/0117486 | A1 | 6/2004 | Bourne et al. |
| 2004/0249709 | A1 | 12/2004 | Donovan et al. |
| 2004/0258053 | A1 | 12/2004 | Toporek et al. |
| 2005/0044321 | A1 | 2/2005 | Bialkowski et al. |
| 2005/0138143 | A1 | 6/2005 | Thompson et al. |
| 2006/0069617 | A1 | 3/2006 | Milener et al. |
| 2006/0106807 | A1 | 5/2006 | DeVitis et al. |
| 2006/0143147 | A1 | 6/2006 | Pearson et al. |
| 2007/0106748 | A1 | 5/2007 | Jakobsson et al. |
| 2007/0143344 | A1 | 6/2007 | Luniewski et al. |
| 2007/0150822 | A1 | 6/2007 | Mansour et al. |
| 2007/0156845 | A1 * | 7/2007 | Devanneaux ..... G06F 17/30902 709/217 |
| 2007/0185986 | A1 | 8/2007 | Griffin et al. |
| 2007/0216674 | A1 | 9/2007 | Subramanian et al. |
| 2008/0222242 | A1 * | 9/2008 | Weiss ................ G06F 17/30902 709/203 |
| 2009/0002481 | A1 | 1/2009 | Kim et al. |
| 2009/0024801 | A1 | 1/2009 | Choi et al. |
| 2009/0222584 | A1 | 9/2009 | Josefsberg et al. |
| 2011/0173345 | A1 | 7/2011 | Knox et al. |
| 2011/0312386 | A1 | 12/2011 | White et al. |
| 2012/0136928 | A1 | 5/2012 | Dillon et al. |
| 2012/0265853 | A1 | 10/2012 | Knox et al. |
| 2013/0007260 | A1 | 1/2013 | Jain et al. |
| 2013/0166634 | A1 | 6/2013 | Holland et al. |
| 2013/0191360 | A1 * | 7/2013 | Burkard ............ G06F 17/30902 707/706 |
| 2014/0006484 | A1 | 1/2014 | Devanneaux et al. |
| 2014/0189069 | A1 | 7/2014 | Gero et al. |
| 2014/0280691 | A1 | 9/2014 | Buerner et al. |
| 2014/0281918 | A1 | 9/2014 | Wei et al. |
| 2014/0359491 | A1 | 12/2014 | Teeraparpwong et al. |
| 2014/0379840 | A1 * | 12/2014 | Dao .................... H04L 67/2847 709/213 |
| 2015/0046789 | A1 | 2/2015 | Wei et al. |
| 2015/0088968 | A1 | 3/2015 | Wei et al. |
| 2015/0088969 | A1 | 3/2015 | Wei et al. |
| 2015/0088970 | A1 | 3/2015 | Wei et al. |
| 2015/0088975 | A1 | 3/2015 | Wei et al. |
| 2015/0089352 | A1 | 3/2015 | Conboy et al. |
| 2015/0120821 | A1 | 4/2015 | Bendell |
| 2016/0191658 | A1 | 6/2016 | Kolam et al. |

OTHER PUBLICATIONS

U.S. Appl. No. 15/011,409, available in IFW.

U.S. Appl. No. 15/048,586, available in IFW.

Barth, A., RFC 6265, HTTP State Management Mechanism, Internet Engineering Task Force (IETF), U.C. Berkeley, Apr. 2011, 37 pages.

Venkataramani, A., The potential costs and benefits of long-term prefetching for content distribution, Computer Communications 25 (2002), Elsevier, 367-375.

HTML Living Standard—Last Updated Oct. 11, 2013, HTML5, Wayback machine archive located at https://web.archive.org/web/20131013212708/http://www.whatwg.org/specs/webapps/currentwork/, 445 pages, (downloaded Dec. 15, 2015).

Padmanabhan et al., Using Predictive Prefetching to Improve World Wide Web Latency, ACM SIGCOMM Computer Communication Review, vol. 26 Issue 3, Jul. 1996, pp. 22-36.

Revision 307873 of Link prefetching FAQ, Sep. 17 2012, at https://developer.mozilla.org/enUS/docs/Web/HTTP/Link_prefetching_FAQ$revision/307873, 5 pages (downloaded Dec. 15, 2015).

U.S. Appl. No. 14/584,770, available in IFW.

U.S. Appl. No. 14/584,820, available in IFW.

U.S. Appl. No. 14/732,123, available in IFW.

Venketesh, et al., Graph Based Prediction Model to Improve Web Prefetching, International Journal of Computer Applications (0975-8887), vol. 36-No. 10, pp. 37-43, Dec. 2011.

Walsh, D. HTML5 Link Prefetching, Jul. 7, 2010 at https://davidwalsh.name/html5prefetch, 12 pages (downloaded Dec. 15, 2015).

Uzonov, A., Speeding Up Tor With SPDY, Master's Thesis, Munich Technical University, Nov. 15, 2013, 124 pages, available at https://gnunet.org/sites/default/files/uzunov2013torspdy.pdf, downloaded as of Sep. 23, 2014.

Trasatti A., blog Measuring the speed of resource loading with JavaScript and HTML5 / Andrea Trasatti's tech notes and more, posted Dec. 10, 2012, 11 pages, available at http://blog.trasatti.it/2012/12/measuring-the-speed-of-resource-loading-wit.

IETF HTTP bis Working Group, Internet-Draft, Nov. 29, 2014, M. Belshe et al., M. Thomson, Ed., Hypertext Transfer Protocol Version 2 (HTTP/2) [draft-ietf-httpbis-http2-16 ], 92 pages.

IETF Request for Comments 7540, May 2015, M. Belshe et al., M. Thomson, Ed., Hypertext Transfer Protocol Version 2 (HTTP/2), 96 pages.

Liljeberg, Enhanced Services for World Wide Web in Mobile WAN Environment, Univ of Helsinki, Department of Computer Science, Series of Publications C, No. C-1996-28, Apr. 1996, 15 pages.

Mike's Lookout Blog, SPDY of the Future Might Blow Your Mind Today, Nov. 17, 2011, 6 pages, available at https://www.belshe.com/2011/11/17/spdy-of-the-future-might-blow-your-mind-today/, downloaded as of Feb. 19, 2015.

Navigation Timing, Editor's Draft Mar. 30, 2012 (Zhiheng Wang, editor), W3C 2012, available at http://dvcs.w3.org/hg/webperf/raw-file/tip/specs/NavigatioTiming/Overview.html, 15 pages.

Navigation Timing, W3C Recommendation, Dec. 17, 2012 (Zhiheng Wang, editor), W3C 2012, available at http://www.w3.org/TR/navigation-timing/, 16 pages, downloaded Feb. 1, 2016.

Nicholas Armstrong, Just-In-Time Push Prefetching: Accelerating the MobileWeb, Univ. of Waterloo Master's Thesis, Waterloo, Ontario, Canada, 2011, 103 pages, available at https://uwspace.uwaterloo.ca/bitstream/handle/10012/6256/Armstrong_Nicholas.pdf?seque.

Program for 29 International Conference on Computers and Their Applications (CATA-2014) by Int'l Society for Computers and Their Applications (ISCA), Mar. 24-26, 2014, Flamingo Hotel, Las Vegas, NV, 9 pages (mentioning presentation on Mar. 26 of Randy Appleton.

Randy Appleton et al., Evaluating Several Different Web Prediction Algorithms, Northern Michigan University, 5 pp., available at http://euclid.nmu.edu/—joshthom/web-paper-randy.pdf, downloaded as of Sep. 23, 2014.

Resource Timing, W3C Candidate Recommendation, May 22, 2012 (Jatinder Mann et al., editors), W3C 2012, available at http://www.w3.org/TR/2012/CR-resource-timing-20120522/, 11 pages.

(56) References Cited

OTHER PUBLICATIONS

Resource Timing, W3C Working Draft, Jan. 13, 2016 (Arvind Jain et al., editors), W3C 2016, available at http://www.w3.org/TR/resource-timing/, downloaded Feb. 1, 2016, 13 pages.

Stuart Schecter et al., Using Path Profiles to Predict HTTP requests, Computer Networks and ISDN Systems 30 (1998) 457-467.

U.S. Appl. No. 14/833,243, filed May 20, 2013, available in IFW.

Web page, GNU's Framework for Secure Peer-to-Peer Networking, Speeding Up Tor with SPDY, dated Nov. 18 2013, available at https://gnunet.org/speedingtorspdy, downloaded as of Jan. 28, 2016, 2 pages.

The Chromium Projects, SPDY: An experimental protocol for a faster web, Internet Archive Wayback machine archive located at http://www.chromium.org/spdy/spdy-whitepaper, 7 pages, (downloaded Jan. 22, 2015).

cache-aware server-push, Issue #421, h2o/h2o, GitHub, internet discussion thread, first comment dated Jul. 24, 2015, 12 pages, downloaded Nov. 21, 2017 from https://github.com/h2o/h2o/issues/421.

Commonly assigned case, U.S. Appl. No. 15/921,426 filed on Mar. 4, 2018, available in IFW.

Commonly assigned case, U.S. Appl. No. 16/270,227 filed on Feb. 7, 2019, available in IFW.

Non-final office action for commonly owned U.S. Appl. No. 15/048,685, filed Feb. 19, 2016, office action dated Apr. 6, 2018, 38 pages.

Notice of allowance for commonly assigned U.S. Appl. No. 15/048,586, dated Nov. 6, 2018, 16 pages.

Notice of allowance for commonly assigned U.S. Appl. No. 15/011,409, dated Oct. 25, 2017, 49 pages.

Non-final office action received Apr. 7, 2020 for commonly owned U.S. Appl. No. 15/921,426, filed Mar. 14, 2018, 26 pages.

Zimmerman, Torsten et al., "How HTTP/2 Pushes the Web: An Empirical Study of HTTP/2 Server," 2017, Chair of Communication and Distributed Systems, RWTH Aachen University, http://dl.fip.org/db/conf/networking2017/1570332989.pdf.

* cited by examiner

| http://www.example.com/pathname/foo/page.html | | | | |
|---|---|---|---|---|
| GET | page.html | 200 OK | | 446ms |
| GET | pageresource-1 | 200 OK | | 103ms |
| GET | pageresource-2 | 200 OK | | 9ms |
| GET | pageresource-3 | 200 OK | | 8ms |
| GET | pageresource-4 | 200 OK | | 0ms |
| GET | pageresource-5 | 200 OK | | 0ms |
| GET | pageresource-6 | 200 OK | | 4ms |
| GET | pageresource-7 | 200 OK | | 0ms |
| GET | pageresource-8 | 200 OK | | 3ms |
| GET | pageresource-9 | 200 OK | | 0ms |
| GET | pageresource-10 | 200 OK | | 0ms |
| GET | pageresource-11 | 200 OK | | 0ms |
| GET | pageresource-12 | 200 OK | | 0ms |
| GET | pageresource-13 | 200 OK | | 0ms |
| GET | pageresource-14 | 200 OK | | 0ms |
| GET | pageresource-15 | 200 OK | | 0ms |
| GET | pageresource-16 | 200 OK | | 0ms |
| GET | pageresource-17 | 200 OK | | 0ms |
| GET | pageresource-18 | 200 OK | | 0ms |
| GET | pageresource-19 | 200 OK | | 0ms |
| GET | pageresource-20 | 200 OK | | 0ms |
| GET | pageresource-21 | 200 OK | | 0ms |
| GET | pageresource-22 | 200 OK | | 0ms |
| GET | pageresource-23 | 200 OK | | 0ms |
| GET | pageresource-24 | 200 OK | | 0ms |
| GET | pageresource-25 | 200 OK | | 113ms |
| GET | pageresource-26 | 200 OK | | 121ms |
| GET | pageresource-27 | 200 OK | | 259ms |

*FIG. 4*

USING RESOURCE TIMING DATA FOR SERVER PUSH

CROSS REFERENCE TO RELATED APPLICATIONS

This application is based on and claims the benefit of priority of U.S. Application No. 62/110,413, filed Jan. 30, 2015, and of U.S. Application No. 62/110,416, filed Jan. 30, 2015, and of U.S. Application No. 62/110,418, filed Jan. 30, 2015, the contents of all of which are hereby incorporated by reference in their entireties.

BACKGROUND

Technical Field

This application relates generally to distributed data processing systems and to the delivery of content to users over computer networks.

Brief Description of the Related Art

Distributed computer systems are known in the art. One such distributed computer system is a "content delivery network" or "CDN" that is operated and managed by a service provider. The service provider typically provides the content delivery service on behalf of third parties. A "distributed system" of this type typically refers to a collection of autonomous computers linked by a network or networks, together with the software, systems, protocols and techniques designed to facilitate various services, such as content delivery or the support of outsourced site infrastructure. This infrastructure is shared by multiple tenants, the content providers. The infrastructure is generally used for the storage, caching, or transmission of content—such as web pages, streaming media and applications—on behalf of such content providers or other tenants. The platform may also provide ancillary technologies used therewith including, without limitation, DNS query handling, provisioning, data monitoring and reporting, content targeting, personalization, and business intelligence.

In a known system such as that shown in FIG. 1, a distributed computer system 100 is configured as a content delivery network (CDN) and has a set of servers 102 distributed around the Internet. Typically, most of the servers are located near the edge of the Internet, i.e., at or adjacent end user access networks. A network operations command center (NOCC) 104 may be used to administer and manage operations of the various machines in the system. Third party sites affiliated with content providers, such as web site 106, offload delivery of content (e.g., HTML or other markup language files, embedded page objects, streaming media, software downloads, and the like) to the distributed computer system 100 and, in particular, to the CDN servers (which are sometimes referred to as content servers, or sometimes as "edge" servers in light of the possibility that they are near an "edge" of the Internet). Such CDN servers 102 may be grouped together into a point of presence (POP) 107 at a particular geographic location.

The CDN servers are typically located at nodes that are publicly-routable on the Internet, in end-user access networks, peering points, within or adjacent nodes that are located in mobile networks, in or adjacent enterprise-based private networks, or in any combination thereof.

Typically, content providers offload their content delivery by aliasing (e.g., by a DNS CNAME) given content provider domains or sub-domains to domains that are managed by the service provider's authoritative domain name service. The server provider's domain name service directs end user client machines 122 that desire content to the distributed computer system (or more particularly, to one of the CDN servers in the platform) to obtain the content more reliably and efficiently. The CDN servers respond to the client requests, for example by fetching requested content from a local cache, from another CDN server, from an origin server 106 associated with the content provider, or other source, and sending it to the requesting client.

For cacheable content, CDN servers typically employ a caching model that relies on setting a time-to-live (TTL) for each cacheable object. After it is fetched, the object may be stored locally at a given CDN server until the TTL expires, at which time is typically re-validated or refreshed from the origin server 106. For non-cacheable objects (sometimes referred to as 'dynamic' content), the CDN server typically returns to the origin server 106 when the object is requested by a client. The CDN may operate a server cache hierarchy to provide intermediate caching of customer content in various CDN servers that are between the CDN server handling a client request and the origin server 106; one such cache hierarchy subsystem is described in U.S. Pat. No. 7,376,716, the disclosure of which is incorporated herein by reference.

Although not shown in detail in FIG. 1, the distributed computer system may also include other infrastructure, such as a distributed data collection system 108 that collects usage and other data from the CDN servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115. A distributed data transport mechanism 120 may be used to distribute control information (e.g., metadata to manage content, to facilitate load balancing, and the like) to the CDN servers. The CDN may include a network storage subsystem (sometimes referred to herein as "NetStorage") which may be located in a network datacenter accessible to the CDN servers and which may act as a source of content, such as described in U.S. Pat. No. 7,472,178, the disclosure of which is incorporated herein by reference.

As illustrated in FIG. 2, a given machine 200 in the CDN comprises commodity hardware (e.g., a microprocessor) 202 running an operating system kernel (such as Linux® or variant) 204 that supports one or more applications 206a-n. To facilitate content delivery services, for example, given machines typically run a set of applications, such as an HTTP proxy 207, a name service 208, a local monitoring process 210, a distributed data collection process 212, and the like. The HTTP proxy 207 (sometimes referred to herein as a global host or "ghost") typically includes a manager process for managing a cache and delivery of content from the machine. For streaming media, the machine may include one or more media servers, such as a Windows® Media Server (WMS) or Flash server, as required by the supported media formats.

A given CDN server 102 seen in FIG. 1 may be configured to provide one or more extended content delivery features, preferably on a domain-specific, content-provider—specific basis, preferably using configuration files that are distributed to the CDN servers using a configuration system. A given configuration file preferably is XML-based and includes a set of content handling rules and directives that facilitate one or more advanced content handling features. The configuration file may be delivered to the CDN server via the data transport mechanism. U.S. Pat. No. 7,240,100, the contents of which are hereby incorporated by reference, describe a useful infrastructure for delivering and managing CDN server content control information, and this and other control information (sometimes referred to as "metadata") can be provisioned by the CDN service provider itself, or (via an extranet or the like) the content provider customer who operates the origin server. U.S. Pat. No. 7,111,057, incorporated herein by reference, describes an architecture for purging content from the CDN. More information about a CDN platform can be found in U.S. Pat. Nos. 6,108,703 and 7,596,619, the teachings of which are hereby incorporated by reference in their entirety.

In a typical operation, a content provider identifies a content provider domain or sub-domain that it desires to have served by the CDN. When a DNS query to the content provider domain or sub-domain is received at the content provider's domain name servers, those servers respond by returning the CDN hostname (e.g., via a canonical name, or CNAME, or other aliasing technique). That network hostname points to the CDN, and that hostname is then resolved through the CDN name service. To that end, the CDN name service returns one or more IP addresses. The requesting client application (e.g., browser) then makes a content request (e.g., via HTTP or HTTPS) to a CDN server machine associated with the IP address. The request includes a host header that includes the original content provider domain or sub-domain. Upon receipt of the request with the host header, the CDN server checks its configuration file to determine whether the content domain or sub-domain requested is actually being handled by the CDN. If so, the CDN server applies its content handling rules and directives for that domain or sub-domain as specified in the configuration. These content handling rules and directives may be located within an XML-based "metadata" configuration file, as mentioned previously.

The CDN platform may be considered an overlay across the Internet on which communication efficiency can be improved. Improved communications techniques on the overlay can help when a CDN server needs to obtain content from origin server 106, or otherwise when accelerating non-cacheable content for a content provider customer. Communications between CDN servers and/or across the overlay may be enhanced or improved using improved route selection, protocol optimizations including TCP enhancements, persistent connection reuse and pooling, content & header compression and de-duplication, and other techniques such as those described in U.S. Pat. Nos. 6,820,133, 7,274,658, 7,607,062, and 7,660,296, among others, the disclosures of which are incorporated herein by reference.

As an overlay offering communication enhancements and acceleration, the CDN server resources may be used to facilitate wide area network (WAN) acceleration services between enterprise data centers and/or between branch-headquarter offices (which may be privately managed), as well as to/from third party software-as-a-service (SaaS) providers used by the enterprise users.

In this vein CDN customers may subscribe to a "behind the firewall" managed service product to accelerate Intranet web applications that are hosted behind the customer's enterprise firewall, as well as to accelerate web applications that bridge between their users behind the firewall to an application hosted in the Internet cloud (e.g., from a SaaS provider).

To accomplish these two use cases, CDN software may execute on machines (potentially in virtual machines running on customer hardware) hosted in one or more customer data centers, and on machines hosted in remote "branch offices." The CDN software executing in the customer data center typically provides service configuration, service management, service reporting, remote management access, customer SSL/TLS certificate management, as well as other functions for configured web applications. The software executing in the branch offices provides last mile web acceleration for users located there. The CDN itself typically provides CDN hardware hosted in CDN data centers to provide a gateway between the nodes running behind the customer firewall and the CDN service provider's other infrastructure (e.g., network and operations facilities). This type of managed solution provides an enterprise with the opportunity to take advantage of CDN technologies with respect to their company's intranet, providing a wide-area-network optimization solution. This kind of solution extends acceleration for the enterprise to applications served anywhere on the Internet. By bridging an enterprise's CDN-based private overlay network with the existing CDN public internet overlay network, an end user at a remote branch office obtains an accelerated application end-to-end. FIG. 3 illustrates a general architecture for a WAN optimized, "behind-the-firewall" service offering such as that described above. Information about a behind the firewall service offering can be found in teachings of U.S. Pat. No. 7,600,025, the teachings of which are hereby incorporated by reference.

For live streaming delivery, the CDN may include a live delivery subsystem, such as described in U.S. Pat. No. 7,296,082, and U.S. Publication Nos. 2011/0173345 and 2012/0265853, the disclosures of which are incorporated herein by reference.

Turning to the topic of network protocols, the Hypertext Transfer Protocol (HTTP) is a well-known application layer protocol in the art. It is often used for transporting HTML documents that define the presentation of web pages, as well as embedded resources associated with such pages. The HTTP 1.0 and 1.1 standards came about in the 1990s. Recently, HTTP 2.0, a major revision to HTTP, has been approved for standards track consideration by the IETF (RFC 7540). The HTTP 2.0 proposed standard has been in development for some time (see, e.g., HTTP version 2, working draft, draft-ietf-httpbis-http2-16, Nov. 29, 2014). According to that working draft and RFC 7540, HTTP 2.0 enables efficient use of network resources and a reduced perception of latency by introducing header field compression and allowing multiple concurrent messages on the same connection. It also introduces unsolicited push of representations from servers to clients. HTTP 2.0 is based on an earlier protocol, SPDY, which also offered an unsolicited push feature.

Server push features present the opportunity for increased efficiencies, but must be used wisely. For example, it is known in the art to predict resources that a client may request, given an initial request (e.g., for a base HTML page). A variety of prediction algorithms are known the art, including the prefetching approaches described in U.S. Pat. No. 8,447,837, US Patent Publication No. 2014/0379840, US Patent Publication No. 2015/0089352, and US Patent Publication No. 2015/0120821, the contents of all of which are hereby incorporated by reference.

It is also known in the art to use predictions to push resources to a client using the push mechanism contemplated in SPDY and HTTP 2.0. Pushing content to the client can result in wasted bandwidth if the prediction is wrong, or if the client already has the resource in a client-side cache. To address this issue, it has been proposed in the prior art that the hint mechanism of SPDY could be used to search the browser's cache to ensure that already-cached resources are not re-fetched by the proxy. (See, e.g., Nicholas Armstrong, Just in Time Push Prefetching: Accelerating the Mobile Web, University of Waterloo Master's Thesis, 2011.) Further, Uzonov (Andrey Uzonov, Speeding Up Tor With SPDY, Master's Thesis, Munich Technical University, 2013) proposes collecting statistical data about resource requests for a page, and for subsequent page requests, pushing resources when his proposed algorithm(s) are confident enough that they would be requested in the page load. The algorithms described by Uzonov take into account the frequency with which a resource is requested overall, or for a particular page load, as well as the number of times that a resource has been seen after the first page load in a session, or in prior page loads. Several algorithms are proposed. Uzonov investigates the use of a cost function for pushing resources that accounts for hits and mistakes. Uzonov also proposes, among other things, considering the device type or browser type (user-agent) in determining whether to push assets, setting a maximum asset size for push, and keeping track of the assets that have provided to the client previously (at the server or at the client) to avoid re-sending them.

While the foregoing approaches are valuable, there remains a need for improved approaches that intelligently determine those objects a server should push to a client, and those objects a server should not push, when leveraging a push mechanism such as that provided HTTP 2.0. The teachings hereof are not necessarily limited to HTTP 2.0, but apply to any mechanism for pushing web page components from a server to a client.

The teachings hereof can be used to improve the efficiency of web page loading and of network usage, among other things.

BRIEF DESCRIPTION OF THE DRAWINGS

The invention will be more fully understood from the following detailed description taken in conjunction with the accompanying drawings, in which:

FIG. 4 is a waterfall chart; and,

DETAILED DESCRIPTION

Figure 1:
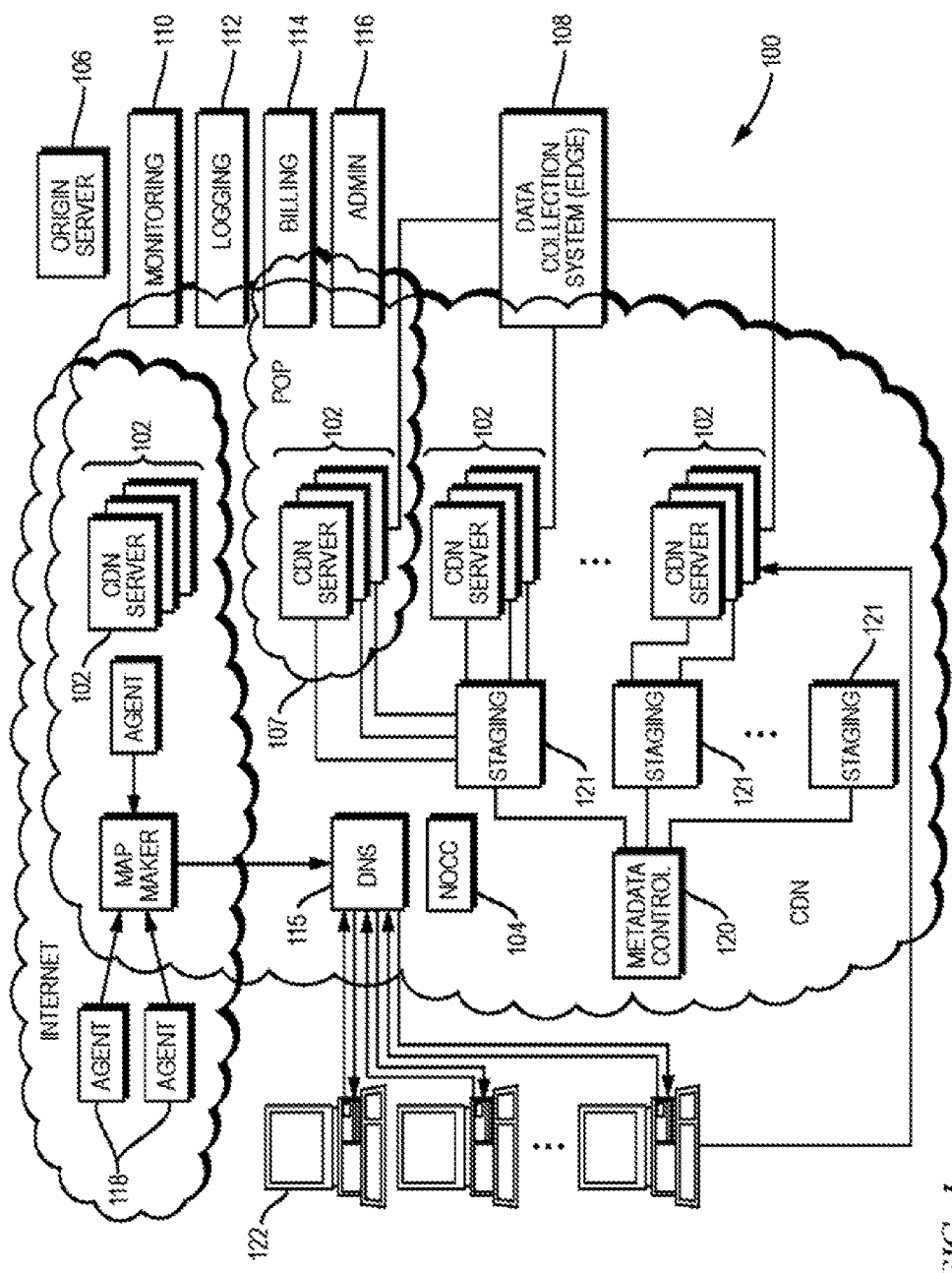
FIG. 1 is a schematic diagram illustrating one embodiment of a known distributed computer system configured as a content delivery network.
Figure 2:
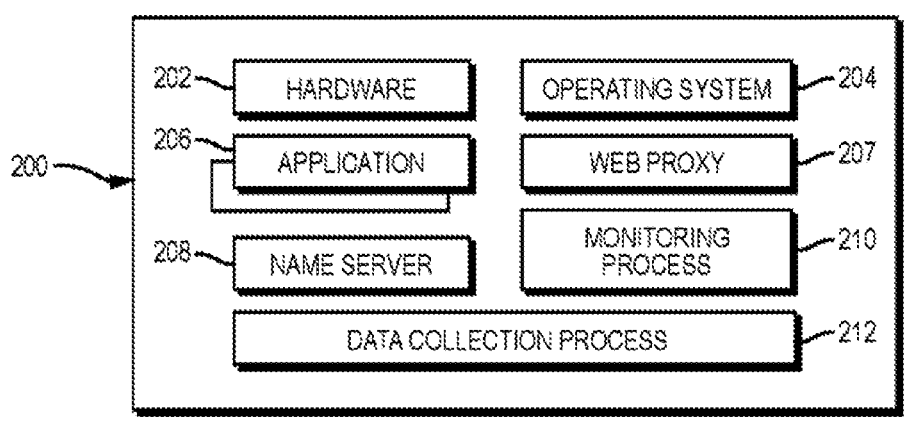
FIG. 2 is a schematic diagram illustrating one embodiment of a machine on which a CDN server in the system of FIG. 1 can be implemented.
Figure 3:
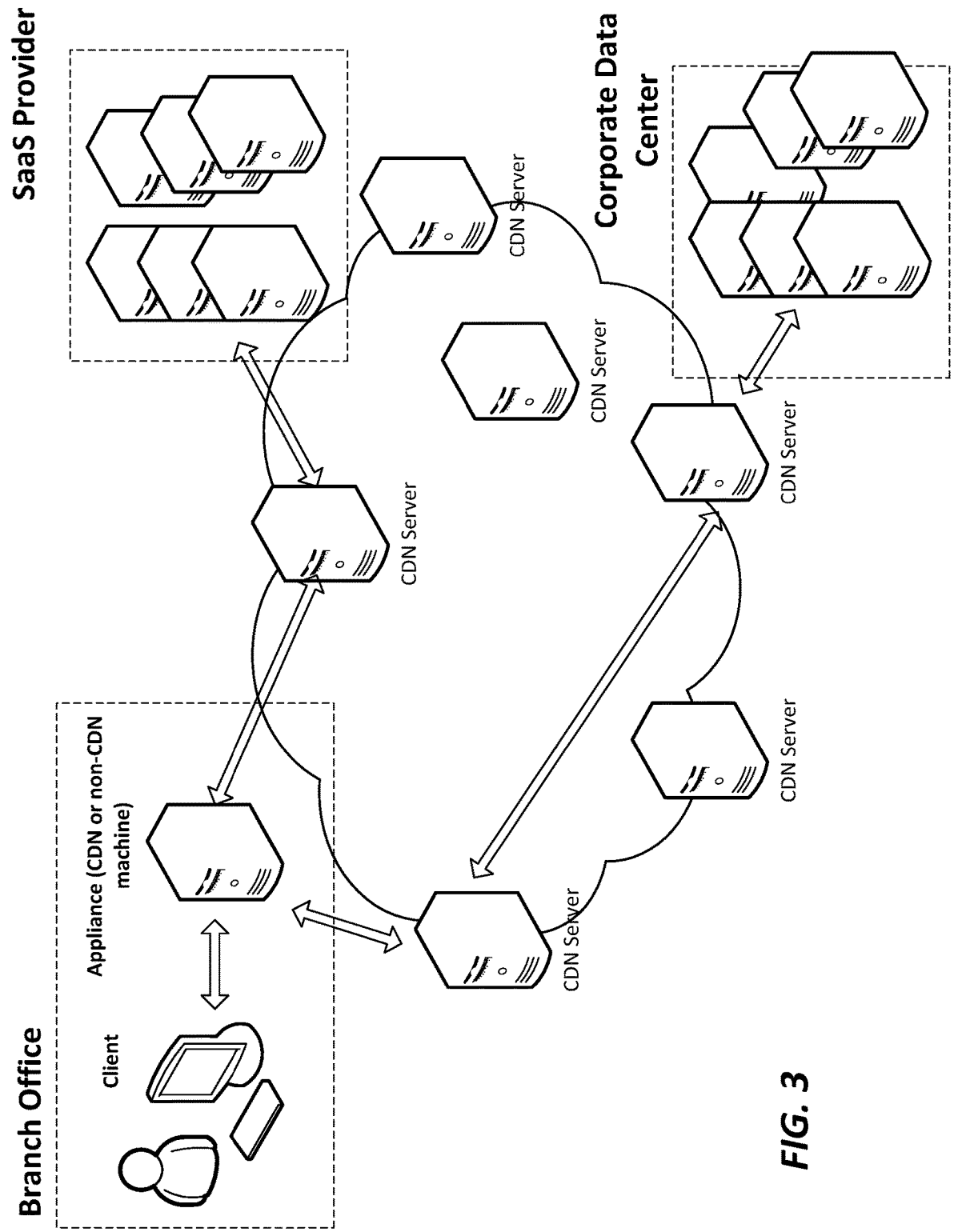
FIG. 3 is a schematic diagram illustrating one embodiment of a general architecture for a WAN optimized, "behind-the-firewall" service offering.

The following description sets forth embodiments of the invention to provide an overall understanding of the principles of the structure, function, manufacture, and use of the methods and apparatus disclosed herein. The systems, methods and apparatus described herein and illustrated in the accompanying drawings are non-limiting examples; the claims alone define the scope of protection that is sought. It is contemplated that implementations of the teachings hereof will vary with design goals, performance desires and later developments, without departing from the teachings hereof. The features described or illustrated in connection with one exemplary embodiment may be combined with the features of other embodiments. Such modifications and variations are intended to be included within the scope of the present invention. All patents, publications and references cited herein are expressly incorporated herein by reference in their entirety.

Throughout this disclosure, the term "e.g." is used as an abbreviation for the non-limiting phrase "for example." Basic familiarity with well-known web page and networking technologies and terms, such as HTML, URL, XML, AJAX, CSS, HTTP, and TCP/IP, is assumed. In this disclosure, the terms page 'object' and page 'resource' are used interchangeably with no intended difference in meaning. The term base page is used herein to refer to page defined by an associated markup language document (e.g., HTML) that references one or more embedded resources (e.g., images, CSS, Javascript, or other types), as known in the art.

Overview

As mentioned above, HTTP 2.0 offers a server-push facility. Typically, a client will open a connection to a server and request a base HTML document for a web page. Typically this base page is not cacheable in a proxy cache server such as those described above (e.g., CDN server 102), and so the proxy server will go forward to origin. According to this disclosure, while waiting for the base HTML of the page to arrive, the proxy server can push objects down to the client via the Push-Promise mechanism of HTTP 2.0. There is also the possibility of pushing content after a particular page load completes. It is expected that a performance benefit of server-push can be achieved by taking advantage of this "dead time" on the wire.

Resource Timing data can be used to provide a feed of information that informs the server what to push to the client. In other words, these resources can be prefetched and then pushed by the server. This patent disclosure discusses two specific cases: pushing content to the client to try to speed up only the page that is currently loading, and pushing content to the client to try to speed up some multi-page transaction that the client is executing.

Pre-pushing content can improve performance, but it needs to be used with caution. Pushing an object that is not used by the client is wasted effort, potentially uses up bytes against an end-user's cellular download limit, potentially increases congestion on the client connection, and can potentially displace more useful resources from the end-user's browser cache.

Resource Timing Data

The Resource Timing API is known the art and is implemented in most browsers. It allows Javascript to extract detailed timing data for each embedded object fetched during the load of a base page. A CDN can gather and beacon back the full suite of Resource Timing (RT) data on a desired percentage (e.g., 1 to 5 percent, or a few percent, or other value) of all page loads of content providers who have enabled the functionality. From the RT data it is possible to reconstruct a waterfall chart showing all the resources that loaded during the page load, and the timings of each. More description of RT data and how it can be collected by a CDN platform is available in US Patent Publication No. 2013/0166634 A1, the contents of which are hereby incorporated by reference in their entirety.

FIG. 4 is a waterfall chart that was reconstructed from real Resource Timing Data collected using a real-user-monitoring system of the kind described in US Patent Publication No. 2013/0166634 A1. It is a partial view that shows load times for some of the resources on the page. The URL and resource names are genericized.

As noted, other resources loaded on the particular page, but the partial view of FIG. 4 illustrates a few points:
1. The base page HTML, page.html, took 446 ms to load, and nothing else was happening on the wire while it was being fetched.
2. Page resources 2 to 23 took little or no time to load, indicating that they were very likely browser-cache hits. This is not definite in all cases, but it's very likely.
3. Several objects immediately below page-resource-24 took multiple hundreds of milliseconds to load.

From this analysis, one can conclude that the simple approach of pushing the first N objects on a page is probably not optimal. The first N objects are likely JS (Javascript), CSS (cascading style sheets), and images that always appear on the page. As such, a browser will generally have them cached, and so pushing them will not speed up the page load at all. As known the art, HTTP 2.0 offers a 'cancel' mechanism whereby the client can cancel a push-promise received from the server, but the push/cancel cycle is likely to be slow and will eat up the limited time available for pushing useful objects. It would be much better in the above example to start by pushing page-resource-25 and not waste time on the earlier resources.

Single-Page Proposal

Since a system can collect RT data on a percentage of all page views, one can get many samples for the same base page over the course of a day or a week. Further, the sampling rate can be controlled to get as many or as few samples as we desire. Given this, it becomes possible to reliably extract several independent metrics from the data:

freq=percentage of samples showing that a particular resource was loaded during the load of a specific base page. If, for example, there are 100 RT records in the database for a particular base page, and 23 of them show an entry for some particular embedded object, then freq for that embedded-object/base-page pair is 23%.

lat=median amount of time it took to load a particular resource. Again, this metric is more formally defined as applying to an object/base-page pair rather than to an object in isolation.

seq=index in the fetch order (how many resources were fetched prior to the one in question). This metric can vary across samples on the same base page due to random timing delays, so we can use a median value computed across observed samples for a given object/base-page pair.

The type of object (image, CSS, JS, etc.) can in most cases be inferred from the file name (e.g., the extension), and where this is not possible an external data-collection utility can gather up the object-type data (the value of the Content-Type header) by doing HEAD or GET requests against specific embedded objects that were identified by RT data.

The product freq*lat can be used to give an indication of how impactful to overall page load time any given resource is. If freq is low, the resource is rarely loaded on the page, and so it's probably not useful to push it. Similarly, if lat is low, the resource is likely often present in the browser cache, so again there's unlikely to be a benefit to pushing it. A process can compute the resources with the highest freq*/at value and publish the results to a table. A subset of the resources can be selected, e.g., by omitting those with values less than some threshold. For example, in one embodiment, the freq threshold might be 40% and the lat threshold might be 20 ms. In other embodiments, the freq might be in a range of 40-70%, and the lat might be in a range of 10-25 ms. In yet another embodiment, the threshold can be 40*30=1200. The threshold can be set on the product (e.g. 40*30, or 40*20, per the prior embodiment) rather than individually on the components (e.g. 40% and 30 ms) in order to focus on overall impact to page load time. For example, a resource with freq=20% and lat=100 ms would be a candidate in this scheme, whereas it would not be if the threshold were applied individually to freq and lat. Approximate ties can be broken by prioritizing resources with lower seq values and/or by preferring certain object types, such as those that represent CSS or Javascript. (More advanced thresholding can also be applied, for example, applying thresholds on freq and lat in addition to their product. As an example, any resource requiring 300 ms or more to load might be automatically considered for push, even if often cached, because the penalty for not having it is so high.) In general one can define some function $f(freq,lat,seq,object\text{-}is\text{-}css\text{-}or\text{-}js)$, and rank objects to pre-push according to the value of the function. In one embodiment, the function can be:

$$Score = freq*lat - K1*seq + K2*(object\text{-}is\text{-}css\text{-}or\text{-}js)$$

Reasonable values for K1 and K2 might be 1 and 10, for example. In other embodiments values might range between K1=1 to 100 and K2=1 to 100, which would allow swinging the weights of the latter two terms up into a range where they actively compete with the first term in most cases. (A weighting—that is, a coefficient—could also be applied to the freq*lat product, in some embodiments.) In this case, if freq=100% and lat=100 ms, then the leftmost term is 10,000 and dominates the rightmost terms no matter what their value. But if freq=10% and lat=10 ms, then the leftmost term is only 100, and the other two terms have significant impact on the results. A proposed implementation might fix these values across all sites (e.g., as defined by hostname), or might allow them to vary from site to site, trying to tune them for optimal performance.

Given the above function, the offline utility (e.g., a computer machine distinct from the CDN proxy servers, such as the back-end system 308 and/or visualization system 310 shown in US Patent Publication No. 2013/0166634 A1) can compute the score for each embedded resource that is on a hostname that is configured to be allowed to be pushed on the base page connection. The HTTP 2.0 specification provides the specific conditions under which an object is a candidate for server-push. For example, the HTTP 2.0 specification indicates that a server that provides a pushed response should be configured for the corresponding request. It states that "A server that offers a certificate only for example.com . . . is not permitted to push a response for 'https://www.example.org/doc.'" See RFC 7540, Sec. 8.2.2.

Given the list of candidate objects and the computed scores, the offline utility can identify the resources with the highest scores, apply some thresholding as described above, and publish a table to a proxy server, such as CDN servers described above. The proxy server can then push one or more of these resources, in scoring order, upon receiving a client request for the base page associated with the table.

The HTTP proxy application on the server will need to store the tables describing which objects to pre-push on each base page. It may not have enough memory to do this for a large number of base pages, so it can track these tables only for the base pages it is serving most often. Alternatively, with some loss of fidelity, the offline process that computes the tables can generate a single table that covers some class of base pages within a given content provider customer.

Finally, it's often the case that a customer publishes different base pages to different groups of end-users. The selection might be based on the device type (hand-held versus tablet versus laptop/desktop), the end-user's language, user-agent, the end-user's geography, or any of a host of other variables. A customer could communicate these distinctions to the CDN, and the offline utility could compute one table in each of these categories for any given base page. For example, a pre-push table for base-page.html for mobile devices, a pre-push table for base-page.html for desktop devices, etc. Targeting the pre-push table to known variants on the base page can significantly improve the pre-push accuracy. More detail about this is provided in the next section.

Clustering for Page Variants

With more work, variants can be computed from the RT data via a clustering algorithm. In one possible approach, the utility would know in advance about a large number of factors that are commonly used to deliver differing base pages, and would compute a table of push objects for each (e.g., a table computed from the RT data that was collected from page loads on mobile devices, or table computed from the RT data that was collected from page loads in a particular geography). The tables that end up with the highest average scoring function would very likely be the ones that most closely match the content provider customer's actual base page variants (e.g., the conclusion being that content provider customer provides a specific page for mobile devices, or for a particular geography). The offline utility could then publish both the table and the basis for computing it (geography, language, cookie value, etc.), and thereby instruct the HTTP proxy in the server about the set of variants to consider.

In one possible implementation, an analysis engine (e.g., implemented by computer machine) might separate the set of beacons (and thereby the RT data) for a given website into a number of distinct partitions. (See, US Patent Publication No. 2013/0166634 A1, incorporated herein by reference, for a description of the beaconing process and in particular the beacon data types in section 3.1.3, which include User Agent string.) Each partition can correspond to a factor that the origin server might use to deliver differing content to differing bodies of end users. So, for example, the engine might separate the set of beacons for one web site (e.g., as keyed by hostname) into two partitions: those that came from mobile devices and those that did not. It might use the User Agent string to make this determination. As known in the art, a User Agent string contains information about the system and browser of a client, which can reveal whether the device is a mobile device (e.g., iOS, iPad, etc.)

Once the beacons have been partitioned in this way, the engine can run the above-described push-candidate-selection algorithm over each of the two partitions. If the two sets of push candidates are significantly different, the engine can conclude that the origin server does indeed deliver different content to mobile devices than it does to non-mobile devices. One approach for determining whether the differences are significant would be to look for fraction of resources that are not shared/common in two partitions. For example, if the common resources are less than a certain threshold (for e.g. 50%, or 70%, or somewhere in between), the system can regard the two partitions to be different. It would thereby know that in the future it should apply this partitioning when computing the actual push lists to be used in production. If, however, the two push lists do not differ significantly, the engine would conclude that the origin does no such selection of content, and therefore that the mobile-versus-non-mobile question can be ignored for production use. Then, the engine might repeat this process for other factors: the geographic location of the client (perhaps based on the language spoken in the country of the client machine or a mapping of IP to geography), the type of hardware the client is using (desktop, laptop, handheld), the estimated connectivity speed of the client (e.g. dial-up, DSL, Cable/Fios®, which can be obtained from commercial geo-location services), and possibly other factors. EdgeScape® from Akamai Technologies Inc. is one commercial service that provides such kinds of information. In general such information can be obtained by having a server(s) record statistics such as round trip time, size and transfer time for requests, and then analyzing this data offline to generate historical throughput and keying off of, e.g., IP address. The IP address can also be characterized into connectivity type based on, e.g., knowledge of an AS and/or throughput to the IP. The engine can then repeat this end-to-end analysis daily or weekly, so as to track changes to the origin behavior with some reasonable latency.

Having completed the above analyses for all each factor in question, the engine can perform a final partition based on all factors which it determined the origin to be sensitive. For example, if the origin is determined to be sensitive to both hardware type and connection speed, the engine can partition the beacons into the following nine sets: (1) desktop machines on dialup, (2) laptop machines dialup, (3) handheld on dialup, (4) desktops on DSL, (5) laptops on DSL, (6) handhelds on DSL, (7) desktops on cable/Fios®, (8) laptops on cable/Fios®, (9) handhelds on cable/Fios®. It can then send the resultant nine distinct set of push lists to the edge servers, along with instructions for the specific conditions (e.g., the above factors) under which that edge server should use each list. If the number of distinct partitions becomes too large to manage, the engine can successively merge the most-similar sets of push lists in order to reduce it.

Transaction Proposal

The above ideas can be extended to the problem of trying to speed up a multi-page web transaction (in other words, a web navigation sequence). For example, it is very common in the eCommerce world to define a transaction of the form:
1. Visit some landing page, like www.customer.com
2. Enter a search term into a box on that page, and thereby be directed to a search results page.
3. Click a link on the search-results page and thereby be directed to a product page.
4. Click the add-to-cart link. This might take you to a new page, or might just submit data to the server, updating some field on the current page from Javascript but not actually visiting any new page.
5. Click on the checkout link and thereby be directed to a checkout page.
6. Sequence through one or more checkout pages to complete the transaction Depending on the design of the site in question, the number of pages visited in such a transaction might vary; a typical amount might be between 2 and about 10.

This raises the possibility of choosing objects to push to the client based on the expected cumulative benefit to the end-to-end transaction, as opposed to the expected benefit for the single page-fetch that is in progress. It also raises the possibility of pushing objects to the client during idle time that occurs while the end-user is reading and/or interacting with the web page, which can substantially expand the number of objects that might be pushed.

In order to accomplish this, the server needs to (1) recognize that a particular end-user is engaged in a particular transaction, (2) identify the expected steps in that transaction prior to the time the end-user has fully executed it, and (3)

identify the content that is most likely to be beneficial for performance on each step of the transaction, and (4) identify the available time windows in which to push. Accomplishing this while maintaining a low rate of wasted pre-push is a significant challenge.

Identifying Time Windows in which to Push

The discussion starts with task (4). A server can immediately open a push time window when it receives a request for a base page HTML document that it has to forward to the origin server. It can close that push window when the base page arrives from the origin. It can re-open the push window when the connection from the end-user has gone idle and remained idle for N milliseconds. N can be something fixed like 200 ms or in a range of 100-500 ms (to make it probable that the delay is not just rendering or Javascript execution time on the client), or it could be derived from the RT data by examining the duration of any dead time that commonly occurs during the fetch of the base page in question.

Identifying Objects to Push

Moving on to task 3, assuming a server knows the expected transaction steps (where steps herein mean pages, i.e., step 1 is page 1 in the sequence, etc.), it can look up the object score tables for each base page in the transaction, and identify the objects with the largest scores across the whole series. Having identified these objects, the server can apply a "discount function" to reduce the scores associated with objects that are nearer the end of the transaction versus nearer the end-users current step in the transaction. This is because the probability of the end-user actually needing these objects diminishes with the number of page views still remaining in the transaction before encountering those objects. In one embodiment the discount function can be a linear function: for example, if an object is not needed until N more steps of the transaction have completed (N pages further in the navigation sequence), the score on that object can be reduced by k*N percent, where k might be about 10, or in a range of about 5-25.

On the first push window (loading the base page on the first step of a transaction), the server can choose to push only objects that are expected to speed up that base page. This is because the initial push window is short, and the server does not yet know that the client is going to engage in a transaction at all. The server can rationally expect that the push window that opens after the first page has been delivered but before the second page has been requested will be longer, and can therefore choose to push objects expected to help later phases of the transaction if the scores so indicated.

When a client requests the base page at step N in the transaction, the server can choose to eliminate all push candidates that were likely needed at a prior step, since the client very likely has these objects already. It can apply a different function on the score here than the one described above, preferably based only on freq. For example, suppose object X is identified as a push candidate at steps 1, 3, 4, and 6 of a transaction, and that the corresponding freq values for object X appearing on the corresponding pages are f1, f3, f4, and f6. When the end-user client makes the request for step 6 (in other words, after making requests at the prior steps and reaching step/page 6), the probability that the client already has object X is $1-(1-f1)*(1-f3)*(1-f4)$. Generalizing, the probability can be calculated as: $1-\pi_1^N (1-freq_N)$ where 1 . . . N are the steps in which the object X was identified as a push candidate. The server can apply a threshold (e.g., about 20%) to this computation to decide whether to push the object at step 6. In other embodiments, other thresholds might be used, e.g., in a range of 10-30%, or otherwise. These are non-limiting examples.

Identifying a Transaction

Current solutions in the field gather RT data for a subset of all page views (e.g., a small percent %), by sampling individual pages at random (without regard to any transaction we might be in). However one can convert these to a transactional sampling approach. A method for achieving this is as follows: when an end-user visits a page, the server will check for the existence of a particular cookie that has domain scope (i.e. applies to the entire site example.com rather than a given page). If it does not exist or enough time has passed since that cookie was last set on this user (e.g., by looking at a timestamp in the cookie), the server will declare this page fetch to be the start of a transaction. It will then decide whether or not it wants to sample this transaction. It might pick purely at random to achieve a particular sampling rate, or it might use characteristics of the page or the end-user to decide to sample (e.g., due to via customer metadata configuration that identifies a landing page, or a customer's preference for optimizing performance for specific bodies of end-users, such as those in a particular geography). If the transaction is selected for sampling, the server sets a cookie with a current timestamp, indicating that all page fetches on the given hostname should be sampled for some period of time (typically a few minutes) from this end-user. The cookie preferably includes a transaction identifier (e.g., a constant that is reported back with the beacon data and enables the system 308/310 to correlate the data corresponding to a given transaction.)

This sampling approach allows a processing engine to extract the most common transactions from the RT data that has accumulated for a given hostname or customers. Alternatively, since many content providers already have web analytics on their sites, one could develop an interface to these web analytics and extract information about the most common transaction (of course, with authorization from the content provider customer).

In an alternative embodiment, rather than transaction sampling approach described above, the system instead employs a 'master' push table. The offline utility, based on the random individual page samples from a defined scope (which are not necessarily known to be in the same transaction) builds a "master" table of pushable resources. The defined scope may be all pages under the site domain name, or a subdomain, domain plus pathname, or other partition, but preferably the scope is broad. The offline utility can rank the resources using the scoring methodology as described above, resulting in a master table of pushable candidates that are associated with the entire domain (or other defined scope). As before, this table is communicated from the offline utility to servers. The push process then proceeds as follows: A server receives a client request for a base page, page.html, under a domain example.com. The server responds with the base page and after client requests, with embedded resources (although some of which may be pushed according to the single-page proposal). After this time, preferably after an idle time such as 200 ms, the server pushes top ranked resources for the example.com domain. While the specific transaction (i.e., web navigation sequence) is not known to the server in this situation, if the client requests another page on the example.com domain, the pushed candidates represent the embedded resources most likely to be requested, per the master table. As those skilled in the art will understand, the logic of the approach follows analogously regardless of the scope of the master table.

Identifying which Transaction an End-User is Starting

After identifying the most common transactions based on URLs visited, it becomes necessary to for the server to identify which transaction an end-user is in before deciding what to push. If the transactions identified in the above steps do not share URLs, or do not share URLs early in the transaction, then the first or second page request issued by the client might be sufficient to identify the transaction at the server. If many transactions have a common starting point (e.g., a common page), then the server has less information upon which to select objects for push. In this case, it can identify the full suite of possible transactions based on the transaction steps seen so far, and assign a probability to each based on how common that transaction is in the data as a whole. Then it can identify all pushable objects across all such transactions, and discount the object scores (i.e., for a given transaction) based on the above-computed probability of how common the transaction is in the data as a whole. From these results it can choose objects to push, applying some minimum threshold value (e.g., about 20%, or in other embodiments in a range of about 10-30%, or other value) to avoid pushing any object that is unlikely to be needed.

Computer Based Implementation

The subject matter described herein may be implemented with computer systems, as modified by the teachings hereof, with the processes and functional characteristics described herein realized in special-purpose hardware, general-purpose hardware configured by software stored therein for special purposes, or a combination thereof.

Software may include one or several discrete programs. A given function may comprise part of any given module, process, execution thread, or other such programming construct. Generalizing, each function described above may be implemented as computer code, namely, as a set of computer instructions, executable in one or more microprocessors to provide a special purpose machine. The code may be executed using conventional apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 5:
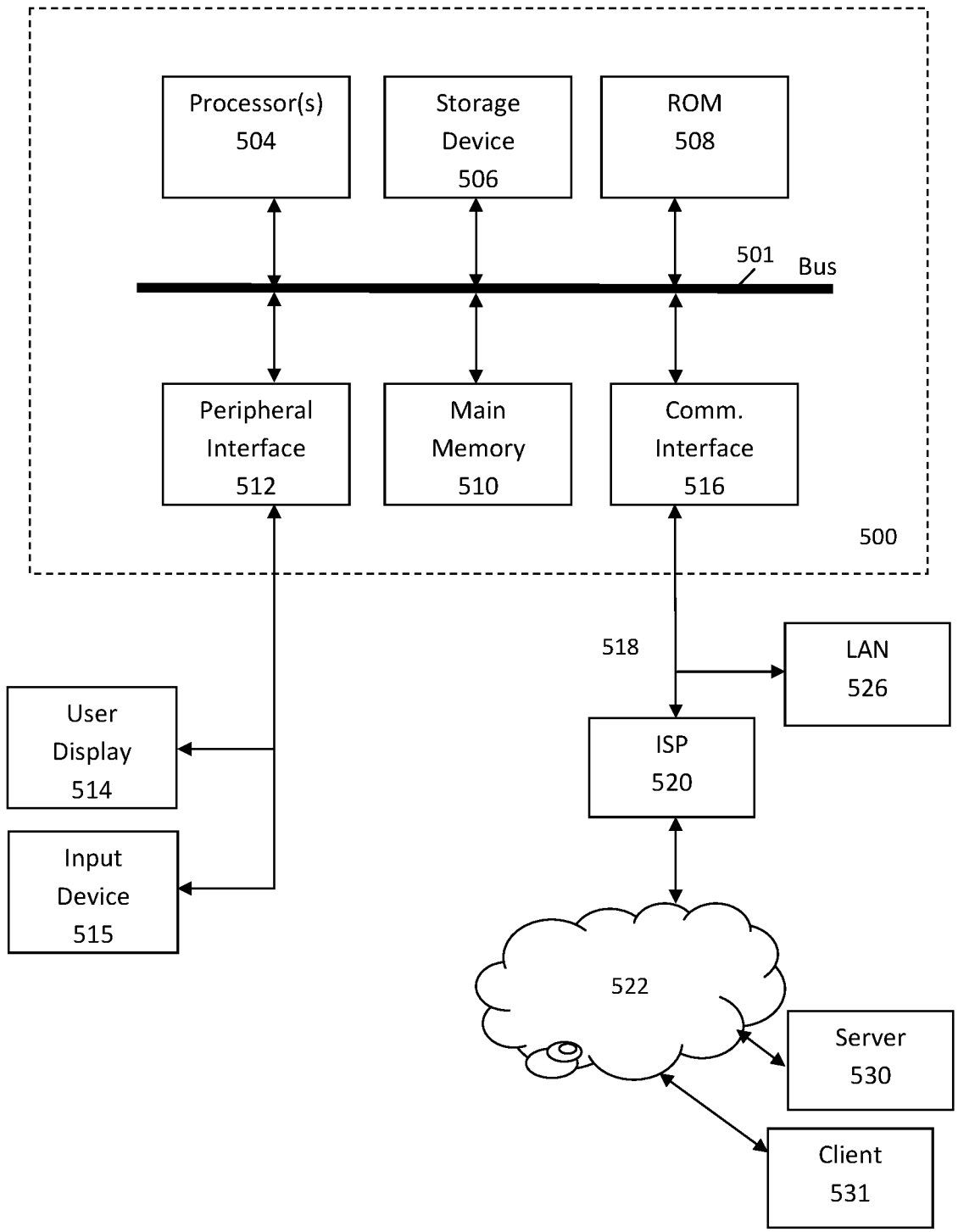
FIG. 5 is a block diagram illustrating hardware in a computer system that may be used to implement the teachings hereof.

FIG. 5 is a block diagram that illustrates hardware in a computer system 500 on which embodiments of the invention may be implemented. The computer system 500 may be embodied in a client device, server, personal computer, workstation, tablet computer, wireless device, mobile device, network device, router, hub, gateway, or other device.

Computer system 500 includes a microprocessor 504 coupled to bus 501. In some systems, multiple microprocessor and/or microprocessor cores may be employed. Computer system 500 further includes a main memory 510, such as a random access memory (RAM) or other storage device, coupled to the bus 501 for storing information and instructions to be executed by microprocessor 504. A read only memory (ROM) 508 is coupled to the bus 501 for storing information and instructions for microprocessor 504. As another form of memory, a non-volatile storage device 506, such as a magnetic disk, solid state memory (e.g., flash memory), or optical disk, is provided and coupled to bus 501 for storing information and instructions. Other application-specific integrated circuits (ASICs), field programmable gate arrays (FPGAs) or circuitry may be included in the computer system 500 to perform functions described herein.

Although the computer system 500 is often managed remotely via a communication interface 516, for local administration purposes the system 500 may have a peripheral interface 512 communicatively couples computer system 500 to a user display 514 that displays the output of software executing on the computer system, and an input device 515 (e.g., a keyboard, mouse, trackpad, touchscreen) that communicates user input and instructions to the computer system 500. The peripheral interface 512 may include interface circuitry and logic for local buses such as Universal Serial Bus (USB) or other communication links.

Computer system 500 is coupled to a communication interface 516 that provides a link between the system bus 501 and an external communication link. The communication interface 516 provides a network link 518. The communication interface 516 may represent an Ethernet or other network interface card (NIC), a wireless interface, modem, an optical interface, or other kind of input/output interface.

Network link 518 provides data communication through one or more networks to other devices. Such devices include other computer systems that are part of a local area network (LAN) 526. Furthermore, the network link 518 provides a link, via an internet service provider (ISP) 520, to the Internet 522. In turn, the Internet 522 may provide a link to other computing systems such as a remote server 530 and/or a remote client 531. Network link 518 and such networks may transmit data using packet-switched, circuit-switched, or other data-transmission approaches.

In operation, the computer system 500 may implement the functionality described herein as a result of the microprocessor executing program code. Such code may be read from or stored on memory 510, ROM 508, or non-volatile storage device 506, which may be implemented in the form of disks, tapes, magnetic media, CD-ROMs, optical media, RAM, PROM, EPROM, and EEPROM. Any other non-transitory computer-readable medium may be employed. Executing code may also be read from network link 518 (e.g., following storage in an interface buffer, local memory, or other circuitry).

A client device may be a conventional desktop, laptop or other Internet-accessible machine running a web browser or other rendering engine, but as mentioned above a client may also be a mobile device. Any wireless client device may be utilized, e.g., a cellphone, pager, a personal digital assistant (PDA, e.g., with GPRS NIC), a mobile computer with a smartphone client, tablet or the like. Other mobile devices in which the technique may be practiced include any access protocol-enabled device (e.g., iOS™-based device, an Android™-based device, other mobile-OS based device, or the like) that is capable of sending and receiving data in a wireless manner using a wireless protocol. Typical wireless protocols include: WiFi, GSM/GPRS, CDMA or WiMax. These protocols implement the ISO/OSI Physical and Data Link layers (Layers 1 & 2) upon which a traditional networking stack is built, complete with IP, TCP, SSL/TLS and HTTP. The WAP (wireless access protocol) also provides a set of network communication layers (e.g., WDP, WTLS, WTP) and corresponding functionality used with GSM and CDMA wireless networks, among others.

In a representative embodiment, a mobile device is a cellular telephone that operates over GPRS (General Packet Radio Service), which is a data technology for GSM networks. Generalizing, a mobile device as used herein is a 3G—(or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol. The mobile device typically also has support for wireless local area network (WLAN) technologies, such as Wi-Fi. WLAN is based on IEEE 802.11 standards. The teachings disclosed herein are not limited to any particular mode or application layer for mobile device communications.

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method, comprising:
   (A) with one or more computers:
      (i) collecting load times for a plurality of resources that are loaded by a plurality of client applications in order to render a given web page;
      (ii) determining a frequency with which each of the plurality of resources are loaded by the plurality of client applications in order to render the given web page;
      (iii) determining a median load time for each of the plurality of resources;
      (iv) ranking the plurality of resources, based at least in part on a function of the frequency of a given resource as determined in (ii) and the median load time of the given resource as determined in (iii), where both the frequency and the median load time are positively weighted to increase a given resource's ranking, wherein said ranking step comprises omitting, from the ranking, resources that are likely to be in a client application's cache by omitting resources with a median load time below a configured minimum threshold; and,
      (v) sending an identification of at least some of the ranked resources to an HTTP proxy server, in an order according to the ranking of the plurality of the ranked resources;
   (B) at the HTTP proxy server:
      (vi) receiving the identification;
      (vii) receiving a request for an HTML document of the given web page from a particular client application; and,
      (viii) in response to the particular client application request, pushing at least one of the ranked resources that was identified to the particular client application, said pushing being in the order that was received from the one or more computers.

2. The method of claim 1, wherein collecting the load times comprises collecting, from the plurality of client applications, resource timing data for the given web page over a plurality of client page loads, the resource timing data comprising the load times for the plurality of resources associated with the given web page.

3. The method of claim 1, wherein sending the identification comprises sending a table identifying some of the ranked resources.

4. The method of claim 1, wherein the plurality of resources comprise any of images, CSS, and Javascript.

5. A system of computing machines, comprising:
   a first computing machine having at least one microprocessor and memory storing computer-readable instructions for execution on the at least one microprocessor, the instructions comprising:
      (i) instructions for collecting load times for a plurality of resources that are loaded by a plurality of client applications in order to render a given web page;
      (ii) instructions for determining a frequency with which each of the plurality of resources are loaded by the plurality of client applications in order to render the given web page;
      (iii) instructions for determining a median load time for each of the plurality of resources;
      (iv) instructions for ranking the plurality of resources, based at least in part on a function of the frequency of a given resource as determined in (iii) and the median load time of the given resource as collected in (i), where both frequency and median load time are positively weighted to increase a given resource's ranking, wherein said ranking step comprises omitting, from the ranking, resources that are likely to be in a client application's cache by omitting resources with a median load time below a configured minimum threshold; and,
      (v) instructions for sending an identification of at least some of the ranked resources to a second computing machine, in an order according to the ranking of the plurality the ranked resources;
   the second computing machine comprising an HTTP proxy server and having at least one microprocessor and memory storing computer-readable instructions for execution on the at least one microprocessor, the instructions comprising:
      (vi) instructions for receiving the identification;
      (vii) instructions for receiving a request for an HTML document of the given web page from a particular client application; and,
      (viii) instructions for, in response to the particular client application request, sending the HTML document and pushing at least one of the resources to the particular client application, said pushing being in the order that was received from the one or more computers.

6. The system of claim 5, wherein collecting the load times comprises collecting, from the plurality of client applications, resource timing data for the given web page over a plurality of client page loads, the resource timing data comprising the load times for the plurality of resources associated with the given web page.

7. The system of claim 5, wherein sending the identification comprises sending a table identifying some of the ranked resources.

8. The system of claim 5, wherein the plurality of resources comprise any of images, CSS, and Javascript.

9. The method of claim 1, wherein the plurality of resources that are ranked as in (iv) comprises any of: images, scripts, and cascading style sheets that were loaded on the given web page to render the given web page.

10. The system of claim 5, wherein the plurality of resources that are ranked as in (iv) comprises any of: images, scripts, and cascading style sheets that were loaded on the given web page to render the given web page.

11. The method of claim 1, wherein the configured minimum threshold is in a range of 10-25 milliseconds.

* * * * *